United States Patent
Ooki et al.

(10) Patent No.: US 7,599,692 B2
(45) Date of Patent: Oct. 6, 2009

(54) METHOD AND SYSTEM FOR WIRELESS LAN COMMUNICATION

(75) Inventors: Yasuomi Ooki, Kawasaki (JP); Yoshikazu Kobayashi, Kawasaki (JP)

(73) Assignee: NEC Infrontia Corporation, Kawasaki-Shi (JP)

( * ) Notice: Subject to any disclaimer, the term of this patent is extended or adjusted under 35 U.S.C. 154(b) by 547 days.

(21) Appl. No.: 10/698,376

(22) Filed: Nov. 3, 2003

(65) Prior Publication Data
US 2004/0106433 A1   Jun. 3, 2004

(30) Foreign Application Priority Data
Nov. 29, 2002  (JP) ............................. 2002-348066

(51) Int. Cl.
*H04W 4/00* (2009.01)
(52) U.S. Cl. ............... 455/432.1; 455/405; 455/406; 455/435.2
(58) Field of Classification Search ............... 455/41.2, 455/405–409, 432.1–433, 452.1–453, 435.1–444
See application file for complete search history.

(56) References Cited

U.S. PATENT DOCUMENTS

| | | | |
|---|---|---|---|
| 6,842,621 B2 * | 1/2005 | Labun et al. ............. | 455/456.3 |
| 6,970,927 B1 * | 11/2005 | Stewart et al. ............. | 709/225 |
| 7,082,117 B2 * | 7/2006 | Billhartz ..................... | 370/338 |
| 7,149,896 B1 * | 12/2006 | Bahl et al. .................. | 713/166 |
| 7,369,841 B1 * | 5/2008 | Uhlik et al. .................. | 455/406 |
| 2002/0007462 A1 * | 1/2002 | Omata ........................ | 713/202 |
| 2002/0176579 A1 * | 11/2002 | Deshpande et al. ......... | 380/270 |
| 2003/0003933 A1 * | 1/2003 | Deshpande et al. ......... | 455/510 |
| 2003/0050062 A1 * | 3/2003 | Chen et al. .................. | 455/435 |
| 2003/0134642 A1 * | 7/2003 | Kostic et al. ................ | 455/450 |
| 2004/0203751 A1 * | 10/2004 | Banaei ..................... | 455/432.1 |

FOREIGN PATENT DOCUMENTS

| | | |
|---|---|---|
| JP | 10-178429 | 6/1998 |
| JP | 11-055286 | 2/1999 |
| JP | 2001-111544 | 4/2001 |
| JP | 2002-125069 | 4/2002 |
| WO | WO 0211466 A2 * | 2/2002 |

* cited by examiner

*Primary Examiner*—Raymond S Dean
(74) *Attorney, Agent, or Firm*—Young & Thompson

(57) ABSTRACT

Disclosed are a wireless LAN communication method and system which allow different service providers to share equipments needed for the system to thereby suppress an investment in equipment and improve the convenience for users. The system and method gather the communication amount and communication time for each of users who have respectively contracted with a plurality of service providers when any of wireless LAN base stations is used by a wireless terminal of that user, and cause that service provider who has contracted with that user who has used that wireless LAN equipment to pay a charge to that service provider who owns the wireless LAN base station in accordance with the gathered communication amount and communication time.

14 Claims, 14 Drawing Sheets

WIRELESS TERMINAL

AUTHENTICATION GATEWAY

SERVICE MANAGEMENT SERVER

INTERPROVIDER USER INFORMATION EXCHANGE SERVER

FIG.7

**TABLE OF SERVICE MANAGEMENT SERVER
(FOR CONTRACTED USERS)**

| USER ID 701 | PASSWORD 702 | MAC ADDRESS 703 | MONTHLY ROAMING COMMUNICATION AMOUNT 704 | MONTHLY ROAMING COMMUNICATION TIME 705 | ROAMING CHARGE 706 |
|---|---|---|---|---|---|
| EXAMPLE: Yamada Suzuki ... | EXAMPLE: XXXXX YYYYY ... | EXAMPLE: 11:22:33:44:55:66 AA:BB:CC:DD:EE:FF ... | EXAMPLE: 20000Kbyte 500Kbyte ... | EXAMPLE: 10:30 2:00 ... | EXAMPLE: ¥2,000 ¥100 ... |

**TABLE OF SERVICE MANAGEMENT SERVER
(FOR USERS CONTRACTED WITH OTHER PROVIDERS)**

| INTERPROVIDER COMMON ID 707 | MAC ADDRESS 708 | MONTHLY ROAMING COMMUNICATION AMOUNT 709 | MONTHLY ROAMING COMMUNICATION TIME 710 | ROAMING CHARGE 711 |
|---|---|---|---|---|
| EXAMPLE: 11223344 11223345 ... | EXAMPLE: 22:33:44:55:66:77 33:44:55:66:77:88 ... | EXAMPLE: 10000Kbyte 300Kbyte ... | EXAMPLE: 9:30 1:30 ... | EXAMPLE: ¥1,500 ¥100 ... |

FIG.8

USER INFORMATION

| INTERPROVIDER COMMON ID 801 | CONTRACTED PROVIDER 802 | PROVIDER INHERENT ID 803 | PROVIDER INHERENT PASSWORD 804 |
|---|---|---|---|
| EXAMPLE: 11223344 11223345 11223346 11223347 ... | EXAMPLE: PROVIDER A PROVIDER A PROVIDER B PROVIDER B ... | EXAMPLE: Tanaka Sato Yamada Suzuki ... | EXAMPLE: TTTTT SSSSS XXXXX YYYYY ... |

ROAMING HISTORY

| INTERPROVIDER COMMON ID 805 | OTHER PROVIDER NAME 806 | MONTHLY ROAMING COMMUNICATION AMOUNT 807 | MONTHLY ROAMING COMMUNICATION TIME 808 | ROAMING CHARGE 809 |
|---|---|---|---|---|
| EXAMPLE: 11223344 ... | EXAMPLE: PROVIDER B PROVIDER C ... | EXAMPLE: 10000Kbyte 600Kbyte ... | EXAMPLE: 9:30 1:30 ... | EXAMPLE: ¥1,500 ¥200 ... |
| EXAMPLE: 11223345 ... | EXAMPLE: PROVIDER B PROVIDER C ... | EXAMPLE: 300Kbyte 400Kbyte ... | EXAMPLE: 1:00 1:15 ... | EXAMPLE: ¥100 ¥150 ... |
| ... | ... | ... | ... | ... |

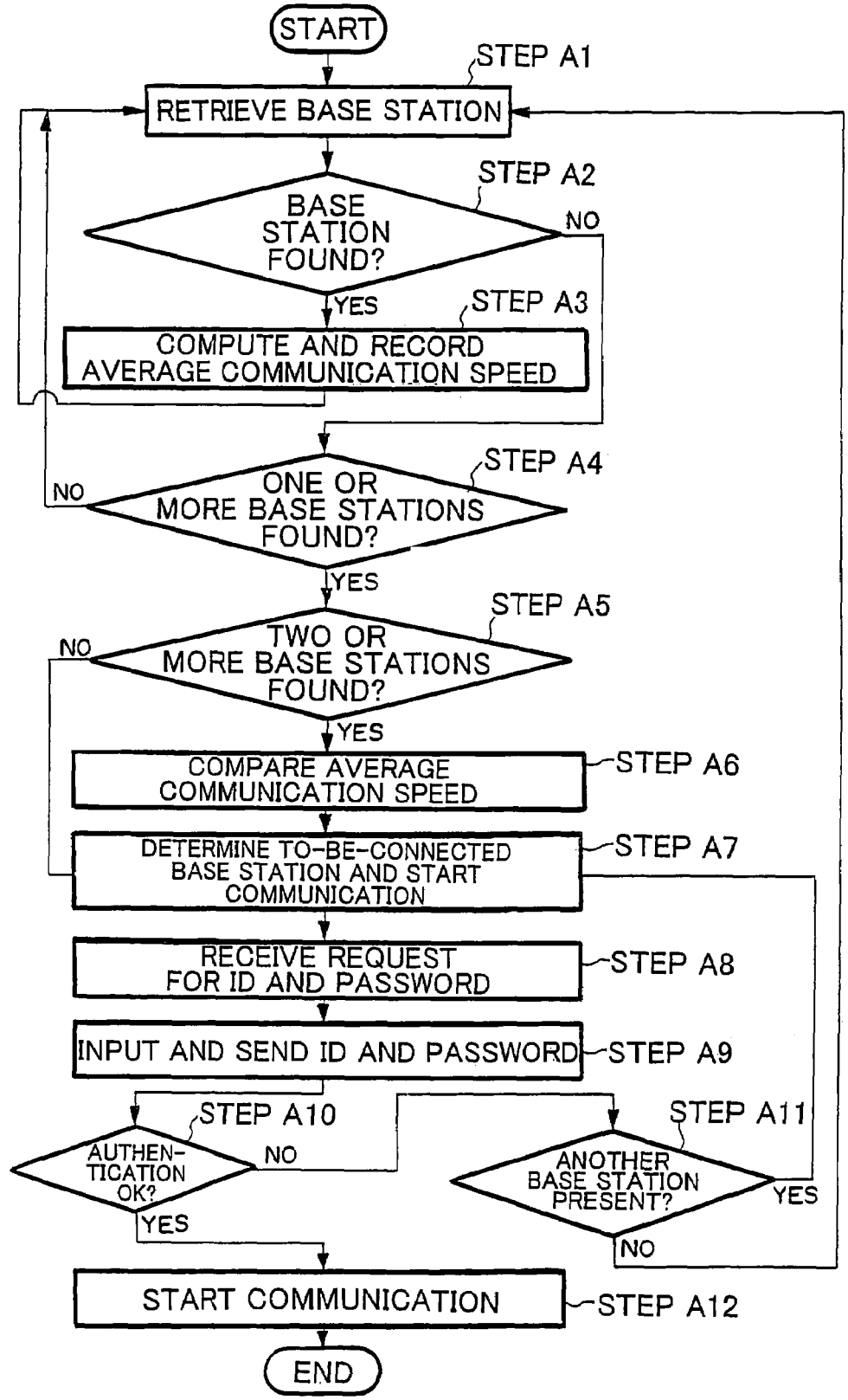

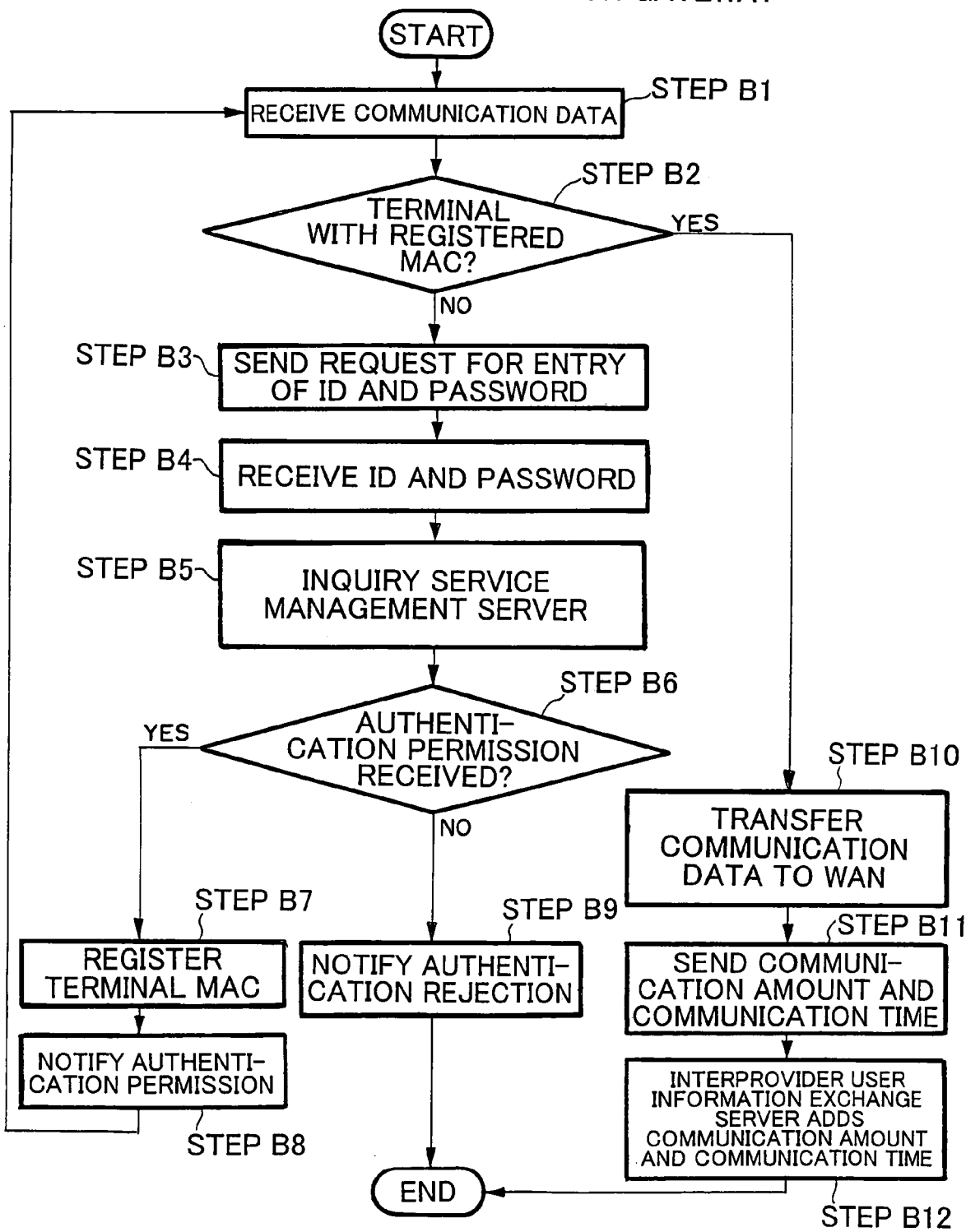

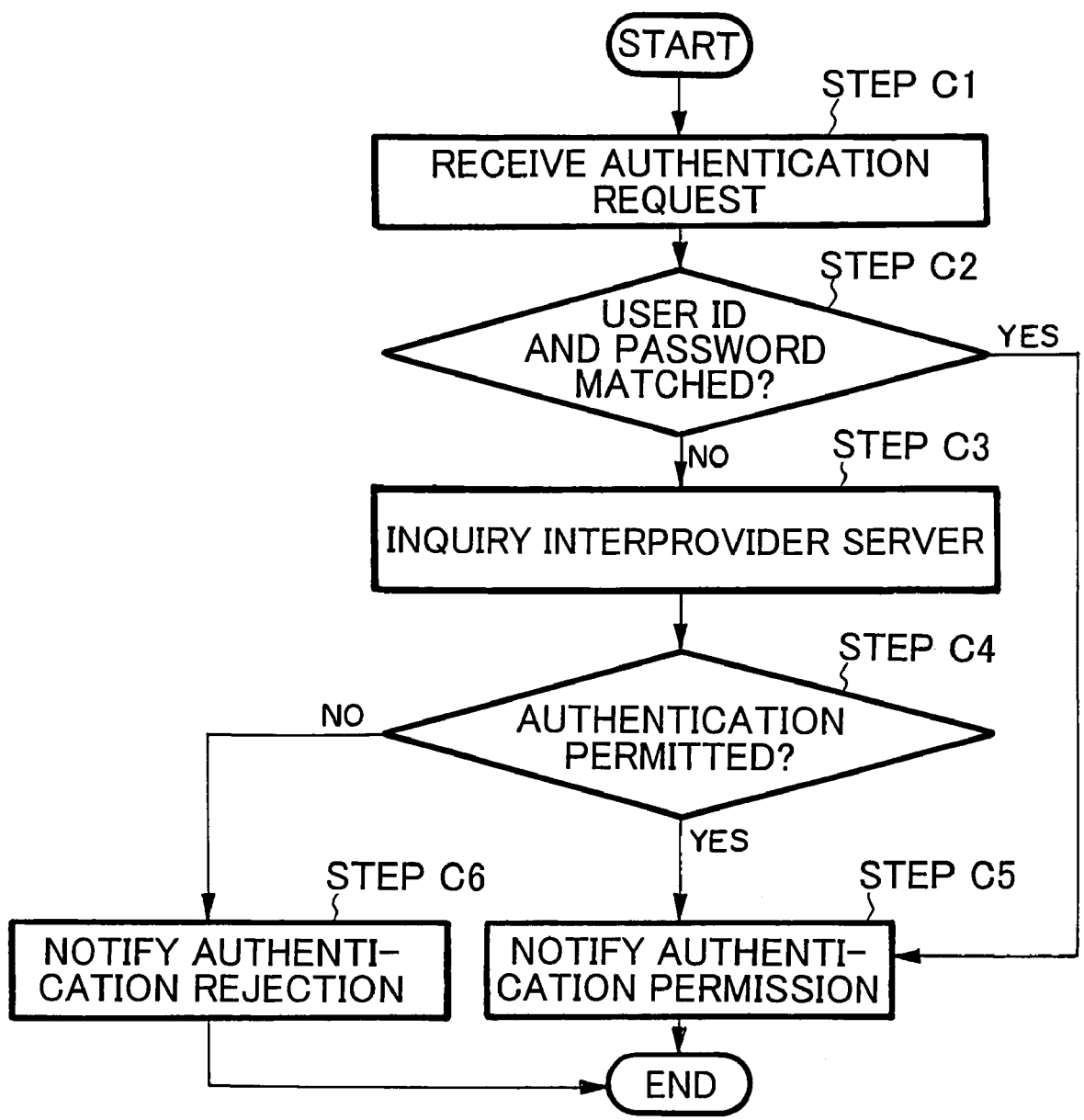

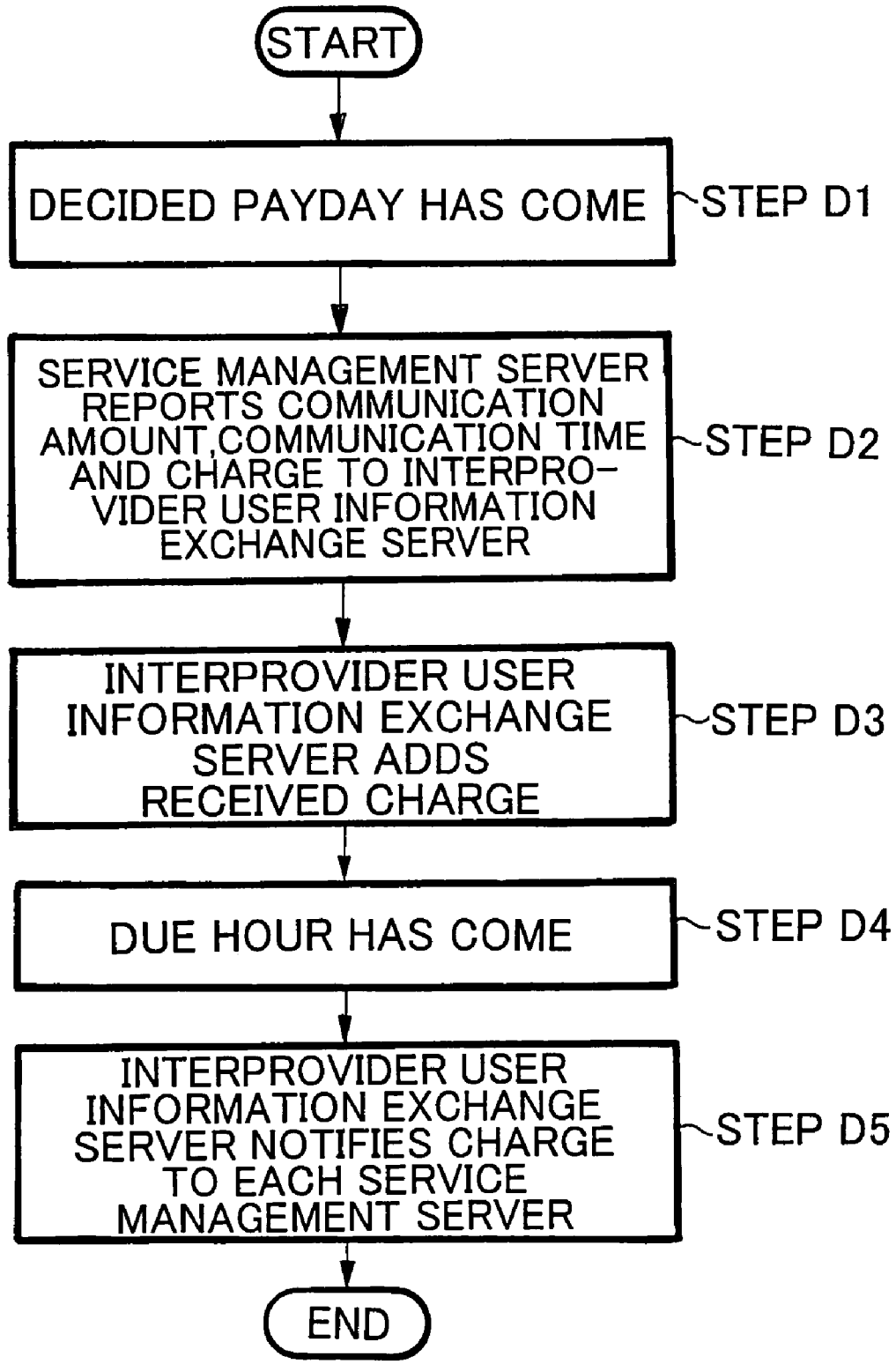

WIRELESS LAN BASE STATION

METHOD AND SYSTEM FOR WIRELESS LAN COMMUNICATION

BACKGROUND OF THE INVENTION

1. Field of the Invention

The present invention relates to a method and system for wireless LAN (Local Area Network) communication, and, more particularly, a technique which allows providers providing a wireless LAN connection service to share wireless LAN equipments like a base station used for the service in a facility, such as a station, shops or a shopping center.

2. Description of the Related Art

Recently have been developed wireless LAN systems which perform wireless LAN communication to the Internet in a public facility, such as a station, or a facility, such as shops or a shopping center. In a shopping center, such as a mall, for example, equipments like wireless LAN base stations are sited in individual shops to effect wireless LAN communication.

Some of conventional wireless LAN systems are, for example, a system as disclosed in JP-A-H10-178429, which can select a base station to which a wireless LAN terminal is connected, or a system as disclosed in JP-A-2002-125069, which performs authentication based on a user ID and password when a wireless IP telephone moves over different subnets and permits roaming when roaming in the subnets has been permitted in advance.

In case that wireless LAN communication is performed in, for example, a shopping center like a mall as mentioned above, a plurality of different wireless LAN hot service providers get in the shopping center. In such a case, as different service providers for different shops provide equipments such as wireless LAN base stations, a wireless LAN communication service.

In case that a plurality of service providers site equipments such as wireless LAN base stations in the shops which have contracted with the respective service providers, however, it is necessary to provide equipment such as a wireless LAN base station for each service provider, resulting in a huge investment in equipment of each service provider. While service providers for adjoining shops, for example, may share equipment such as a wireless LAN base station, the conventional systems have no technique of allowing different service providers to share equipment.

For example, the wireless LAN system disclosed in JP-A-H10-178429 can ensure efficient use of the system by connecting wireless LAN terminals to a base station to be connected in accordance with the priority order, but does not share equipment among different service providers.

The wireless LAN system disclosed in JP-A-2002-125069 permits talking via a wireless IP telephone in case where roaming in subnets is permitted in beforehand. Likewise, this system does not share equipment among different service providers.

SUMMARY OF THE INVENTION

The present invention has been devised in consideration of the conventional circumstances and aims at providing a wireless LAN communication method and system which allow different service providers to share equipments needed for the system, thereby suppressing an investment in equipment and improving the convenience for users.

To achieve the object, according to one aspect of the invention, there is provided a method of wireless LAN (Local Area Network) communication, comprising the steps of: communicating data between a wireless LAN equipment for each of service providers to be connected to an Internet and a user terminal for each of users, wherein said wireless LAN equipment is managed by any one of the service providers and is shared by the service providers; collecting data of a communication amount and communication time of said user terminal of the each of users, when said user terminal communicates with said wireless LAN equipment using wireless LAN communication; and calculating data of a charge on usage of said wireless LAN equipment in accordance with the collected data, whereby the service provider to be contracted with the user of said user terminal pays the charge to the service provider for managing said wireless LAN equipment.

According to another aspect of the invention, there is provided a method of wireless LAN (Local Area Network) communication, comprising the steps of: communicating data between a wireless LAN equipment for each of service providers to be connected to an Internet and a user terminal for each of users, wherein said wireless LAN equipment is presited in common space managed by a manager and is shared by the service providers; collecting data of a communication amount and communication time of said user terminal of the each of users, when said user terminal communicates with said wireless LAN equipment using wireless LAN communication; and calculating data of a charge on usage of said wireless LAN equipment in accordance with the collected data, whereby the service provider to be contracted with the user of said user terminal pays the charge to the manager.

According to a further aspect of the invention, there is provided a method of wireless LAN (Local Area Network) communication, comprising the steps of: communicating data between a wireless LAN equipment for each of service providers to be connected to an Internet and a user terminal used for users, wherein said wireless LAN equipment is managed by any one of the service providers and is shared by the service providers; enabling said user terminal to select the wireless LAN equipment with high communication speed; exchanging user's information among the service providers, when said user terminal selects said wireless LAN equipment and the selected wireless LAN equipment is managed by the service provider not to be contracted the user of said user terminal; collecting data of a communication amount and communication time of said user terminal of the each of users, when said user terminal communicates with said wireless LAN equipment using wireless LAN communication; and calculating data of a charge on usage of said wireless LAN equipment in accordance with said collected data and said exchanged user information, whereby the service provider to be contracted with the user of said user terminal pays said charge to the service provider for managing said wireless LAN equipment.

According to a still further aspect of the invention, there is provided a system for wireless LAN (Local Area Network) communication, comprising: means for communicating data between a wireless LAN equipment for each of service providers to be connected to an Internet and a user terminal for each of users, wherein said wireless LAN equipment is managed by any one of the services provider and is shared by the service providers; means for collecting data of a communication amount and communication time of said user terminal of the each of users when said user terminal communicating with said wireless LAN equipment using wireless LAN communication; and means for calculating data of a charge on usage of said wireless LAN equipment in accordance with the collected data, whereby the service provider to be contracted with the user of said user terminal pays the charge to the service provider for managing said wireless LAN equipment.

According to a yet further aspect of the invention, there is provided a system for wireless LAN (Local Area Network) communication, comprising: means for communicating data between a wireless LAN equipment for each of service providers to be connected to an Internet and a user terminal for each of users, wherein said wireless LAN equipment is pre-sited in common space managed by a manager and is shared by the service providers; means for collecting data of a communication amount and communication time of said user terminal of the each of users when said user terminal communicates with said wireless LAN equipment using wireless LAN communication; and means for calculating data of a charge on usage of said wireless LAN equipment in accordance with the collected data, whereby the service provider to be contracted with the user of said user terminal pays the charge to the manager.

According to a still further aspect of the invention, there is provided a system for wireless LAN (Local Area Network) communication, comprising: a wireless LAN equipment for each of service providers connected to an Internet, said wireless LAN equipment being managed by any one of the services provider and being shared by the service providers; a user terminal for said each of users to be communicated with said wireless LAN equipment using wireless LAN communication; and an information exchange server for exchanging user's information among the service providers, wherein said user terminal comprises selecting means for selecting said wireless LAN equipment with high communication speed, and said wireless LAN equipment comprises a service management server for managing user's information of the each of users, and for transmitting said user information to said information exchange server, when said selecting means selects wireless LAN equipment managed by the service provider not to be contracted with the user of said user terminal, means for collecting data of a communication amount and communication time of said user terminal of the each of users, when said user terminal communicates with said wireless LAN equipment, and means for calculating data of a charge on usage of said wireless LAN equipment in accordance with the collected data, whereby the service provider to be contracted with the user of said user terminal pays the charge to the service provider for managing said wireless LAN equipment.

BRIEF DESCRIPTION OF THE DRAWINGS

FIG. 7 is a diagram illustrating the internal table of the service management server;

FIG. 8 is a diagram illustrating the internal table of the interprovider user information exchange server;

FIG. 9 is a flowchart illustrating the flow of processes of a wireless terminal;

FIG. 10 is a flowchart illustrating the flow of processes of the authentication gateway;

FIG. 11 is a flowchart illustrating the flow of processes of the service management server;

FIG. 12 is a flowchart illustrating the flow of a roaming charge settling process;

DETAILED DESCRIPTION OF THE PREFERRED EMBODIMENTS

Preferred embodiments of the present invention will be described in detail below with reference to the accompanying drawings. To begin with, the invention provides a business model which allows different service providers to share equipments, such as wireless LAN base stations, to thereby improve the convenience for users, suppress an investment in equipment and provide the service providers with stable incomes in case where a plurality of service providers who provide a service for wireless LAN communication to the Internet are in a facility in a station or shops or a facility in a shopping center such as a mall.

First Embodiment

Figure 1:
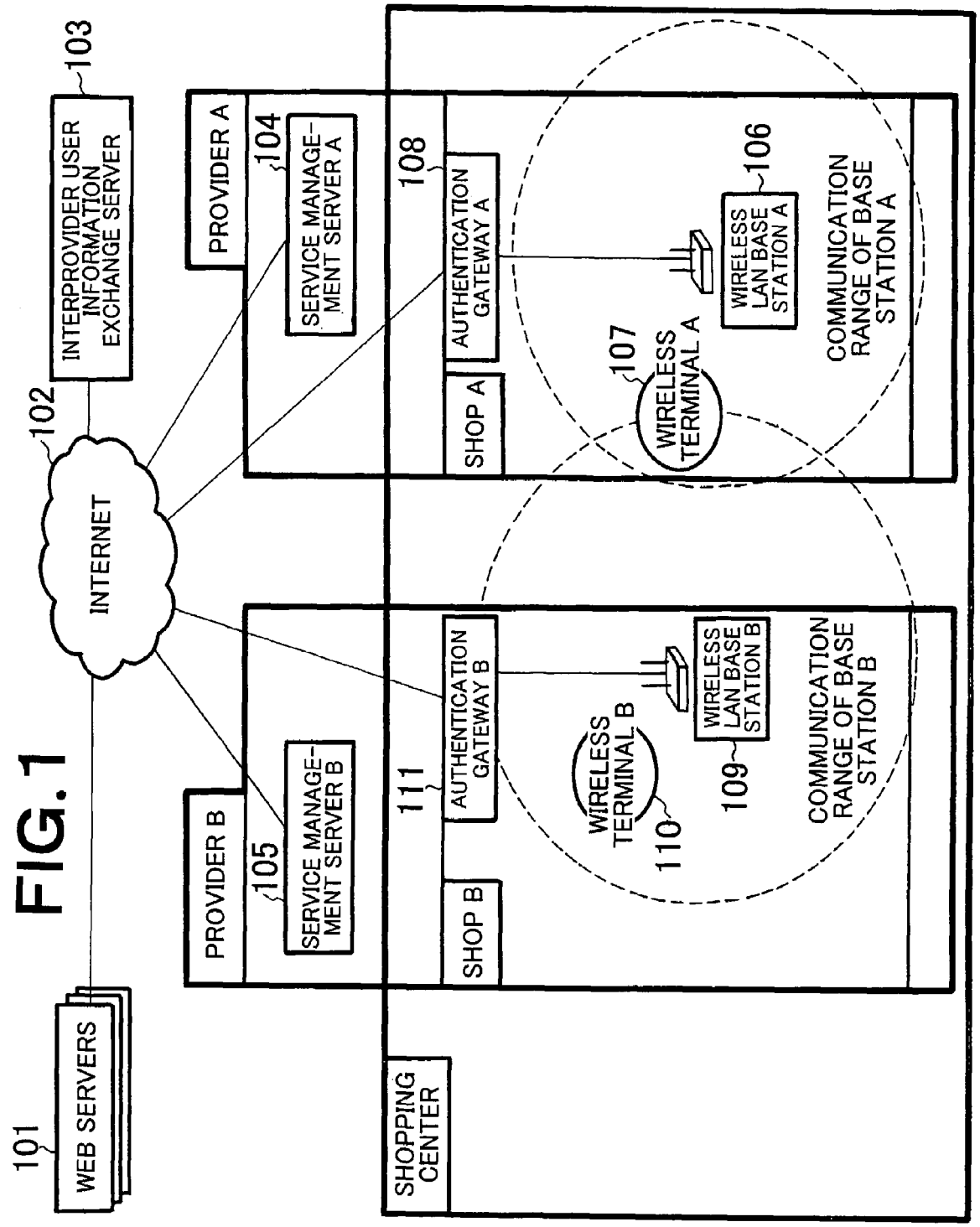
FIG. 1 is a block diagram illustrating a wireless LAN communication system according to one embodiment of the present invention.

FIG. 1 is a block diagram illustrating the first embodiment of the present invention. The following description of the first embodiment will be given of a business model of a wireless LAN communication connection service in case where a wireless LAN communication connection service provider A and a wireless LAN communication connection service provider provide services in a shop A and a shop B, respectively. In FIG. 1, "101" denotes Web servers, "102" denotes the Internet and "103" is an interprovider user information exchange server. The interprovider user information exchange server 103 exchanges user information among different service providers and performs management in case where different service providers share equipment.

Different wireless LAN communication connection service providers, namely, a provider A and a provider B, are involved in the shop A and shop B, respectively. A service management server A 104 is owned by the provider A and a service management server B 105 is owned by the provider B. The Internet 102 is connected to those servers 104 and 105. The service management server A 104 and service management server B 105 manage information on users who have contracted with the respective providers A and B.

The shop A includes a wireless LAN base station A 106, a wireless terminal A 107 which is used by a user who is using the wireless LAN communication service and an authentication gateway A 108 which executes authentication to connect the wireless LAN base station A 106 to the Internet 102. The shop B includes a wireless LAN base station B 109, a wireless terminal B 110 which is used by a user who is using the wireless LAN communication service and an authentication gateway B 111 which executes authentication to connect the wireless LAN base station B 109 to the Internet 102. It is assumed that the wireless terminal A 107 is sited at the boundary between communication ranges of the base station A 106 and the base station B 109.

Although there is a single wireless LAN base station in each shop for the sake of convenience in FIG. 1, each shop may have a plurality of wireless LAN base stations sited therein. The number of wireless terminals, the number of shops or the number of providers are not restrictive and may be greater than those quantities shown in FIG. 1.

According to the embodiment, as mentioned above, different wireless LAN communication connection service providers are in the shops A and B. Normally, a user who is using the wireless terminal A 107 in the shop A which has a contract with the provider A accesses the Internet 102 using the wireless LAN base station A 106. In case where the wireless LAN base station A 106 has a heavy traffic and the communication speed is slow, the wireless terminal A 107 uses the wireless LAN base station B 109 because it lies in the communication range of the wireless LAN base station B 109 owned by the provider B for the shop B. In this case, the provider A pays a charge for using the wireless LAN base station B 109 to the provider in accordance with the amount of usage (time, communication amount) of the wireless LAN base station B 109.

As apparent from the above, each provider can reduce the number of wireless LAN base stations to be sited, thus lowering the investment in equipment, and can obtain a stable income by increasing the service factor of the base station by renting the base station to another provider when the base station is not used much. This is particularly effective in case where a shop whose main business hours are in the night (e.g., a pub, a bar or the like) and a shop whose main business hours are in the daytime (e.g., a fast-food shop, a restaurant or the like) are adjacent to each other, because the time zone where one shop is overcrowded is a non-busy time zone for the other.

Figure 2:
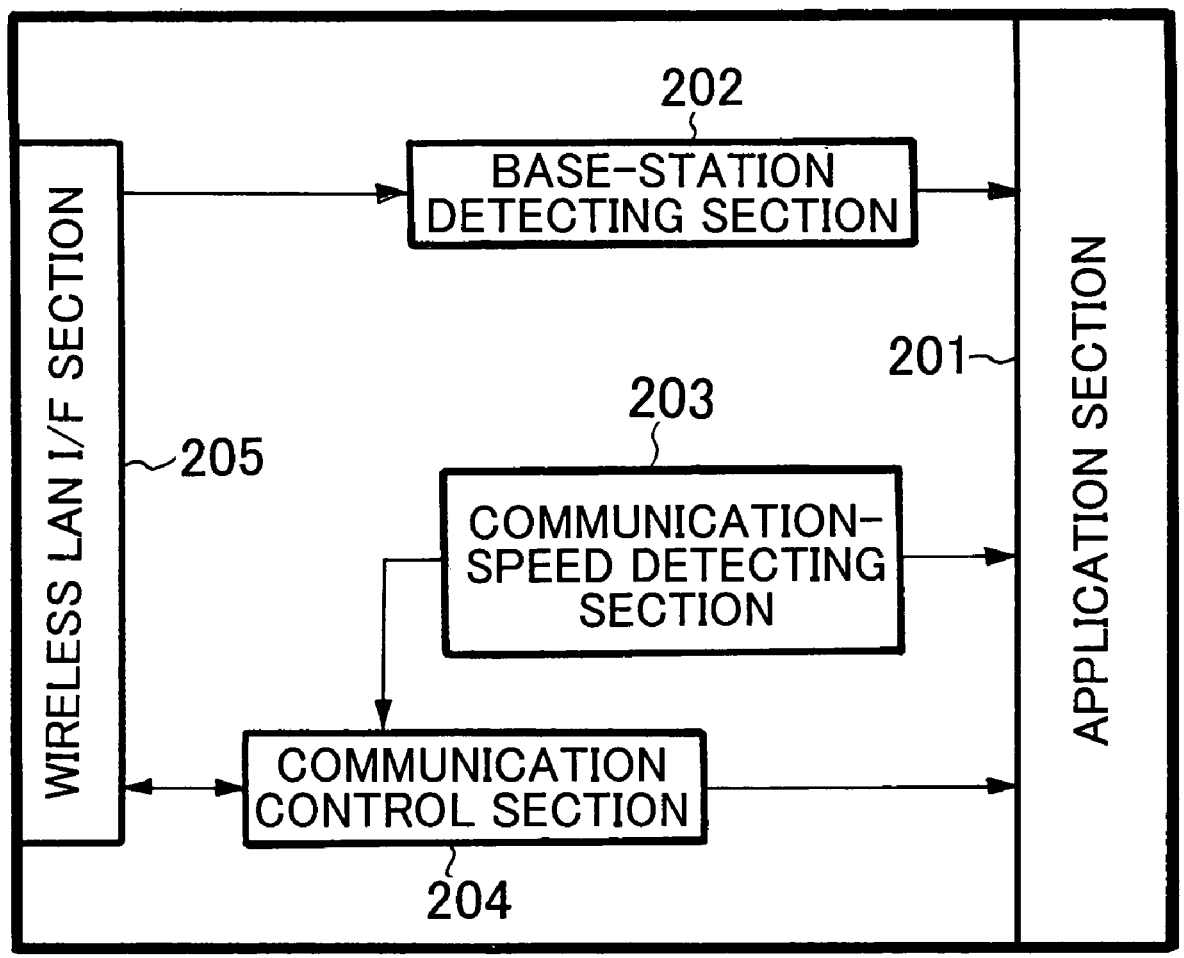
FIG. 2 is a block diagram showing the structure of a wireless terminal in FIG. 1.

FIG. 2 is a block diagram showing the structure of the wireless terminal. The wireless terminal comprises an application section 201, a base-station detecting section 202, a communication-speed detecting section 203, a communication control section 204 and a wireless LAN I/F section 205 as shown in FIG. 2. Those sections roughly operate as follows. First, the application section 201 gives instructions to provide a user with a screen display, detect an input by the user, compare an average speeds detected by the base-station detecting section 202, determine the optimal base station to connect (hereinafter referred to as "to-be-connected base station"), and start or stop communication to the communication control section 204.

The base-station detecting section 202 detects a communicatable wireless LAN base station by identifying a beacon signal of each wireless LAN base station received from the wireless LAN I/F section 205 and informs the application section 201 of such a wireless LAN base station. The communication-speed detecting section 203 monitors the communication control section 204 and computes the current communication speed and the communication speed.

The communication control section 204 transmits data received from the wireless LAN I/F section 205 to the application section 201 and transmits data requested for transmission by the application section 201 to the wireless LAN I/F section 205. The wireless LAN I/F section 205 performs data transmission and reception to and from a base station.

Figure 3:
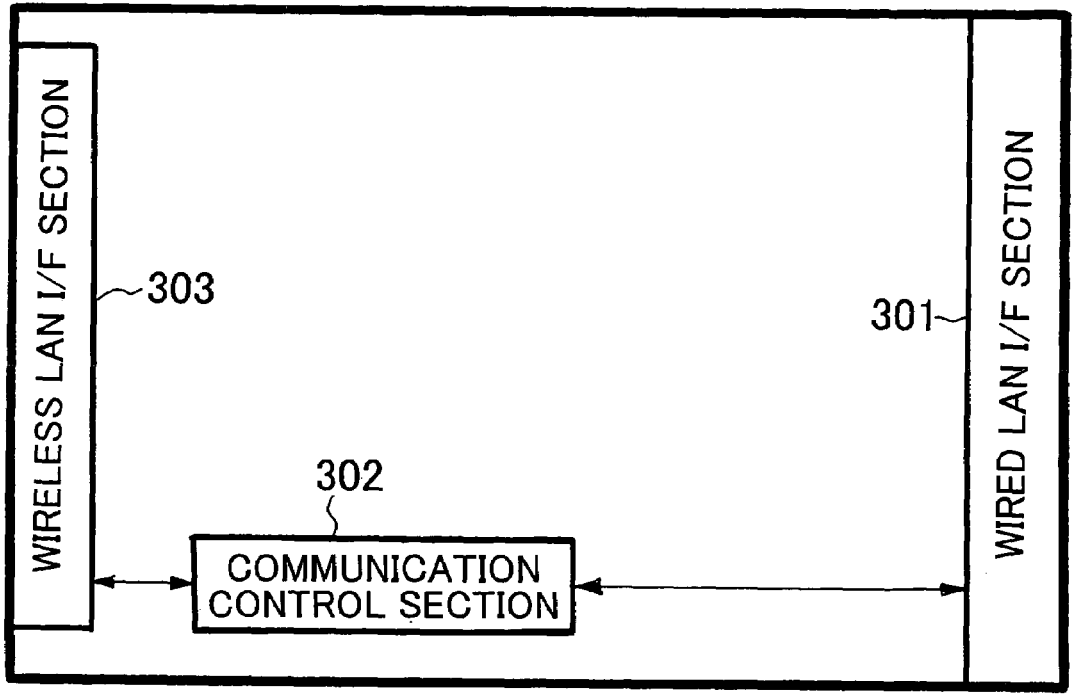
FIG. 3 is a block diagram showing the structure of a wireless LAN base station in FIG. 1.

FIG. 3 is a block diagram showing the structure of the wireless LAN base station. Each of the wireless LAN base stations A and B comprises a wired LAN I/F section 301, a communication control section 302 and a wireless LAN I/F section 303, as shown in FIG. 3. Those sections roughly operate as follows.

First, the wired LAN I/F section 301 performs data transmission and reception to and from a wired LAN. The communication control section 302 controls transmission of data received from the wireless LAN I/F section 303 to the wired LAN I/F section 301 and transmission of data received from the wired LAN I/F section 301 to the wireless LAN I/F section 303. The wireless LAN I/F section 303 performs data transmission and reception to and from a wireless terminal.

Figure 4:
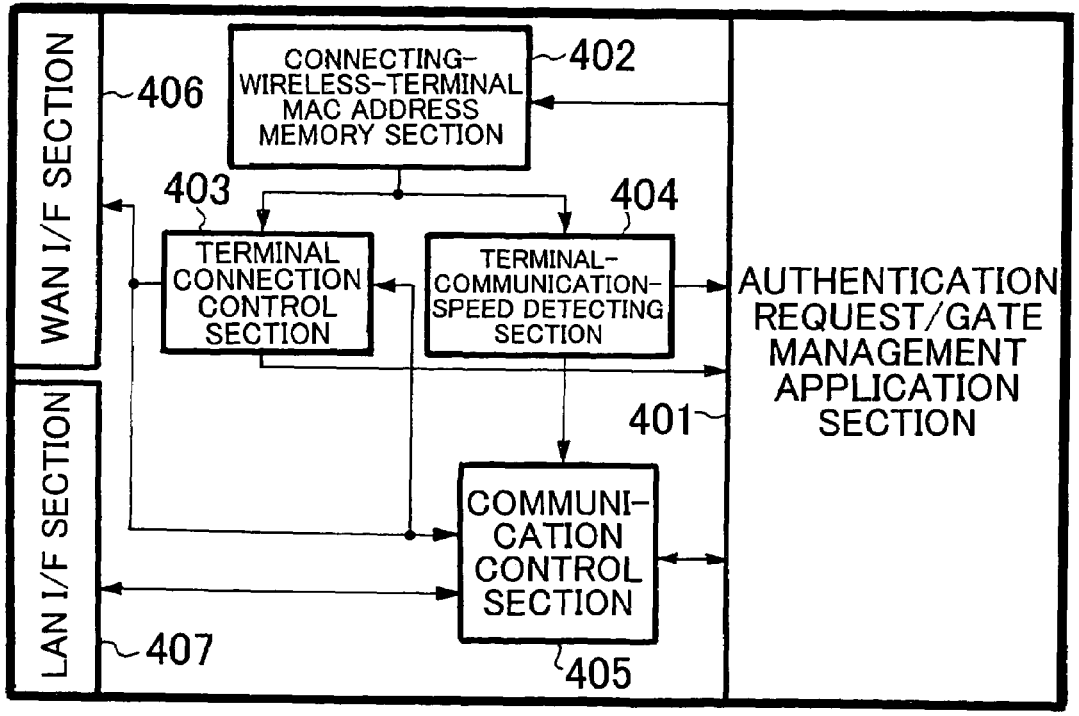
FIG. 4 is a block diagram showing the structure of an authentication gateway in FIG. 1.

FIG. 4 is a block diagram showing the structure of the authentication gateway. As shown in FIG. 4, each of the authentication gateways A and B comprises an authentication request/gate management application section 401, a connecting-wireless-terminal MAC address memory section 402, a terminal connection control section 403, a terminal-communication-speed detecting section 404, a communication control section 405, a WAN I/F section 406 and a LAN I/F section 407. The following are the schematic operations of those sections.

First, when informed of reception of data from a terminal which has a non-authenticated MAC address by the terminal connection control section 403, the authentication request/gate management application section 401 requests the terminal to input an ID and password. The connecting-wireless-terminal MAC address memory section 402 stores or deletes the MAC address of the wireless terminal in response to an instruction from the authentication request/gate management application section 401.

The terminal connection control section 403 monitors the communication control section 405. In case where communication data is transmitted from a wireless terminal which has not been memorized in the connecting-wireless-terminal MAC address memory section 402, the terminal connection control section 403 blocks that communication and informs the authentication request/gate management application section 401 of that event. The terminal-communication-speed detecting section 404 monitors the communication control section 405, computes the communication amount and average communication speed and informs the authentication request/gate management application section 401 of those values. The communication control section 405 performs communication control between the LAN I/F section 407 and the WAN I/F section 406. The WAN I/F section 406 performs data transmission and reception to and from the Internet 102 and the LAN I/F section 407 mainly performs data transmission and reception to and from a wireless LAN base station.

Figure 5:
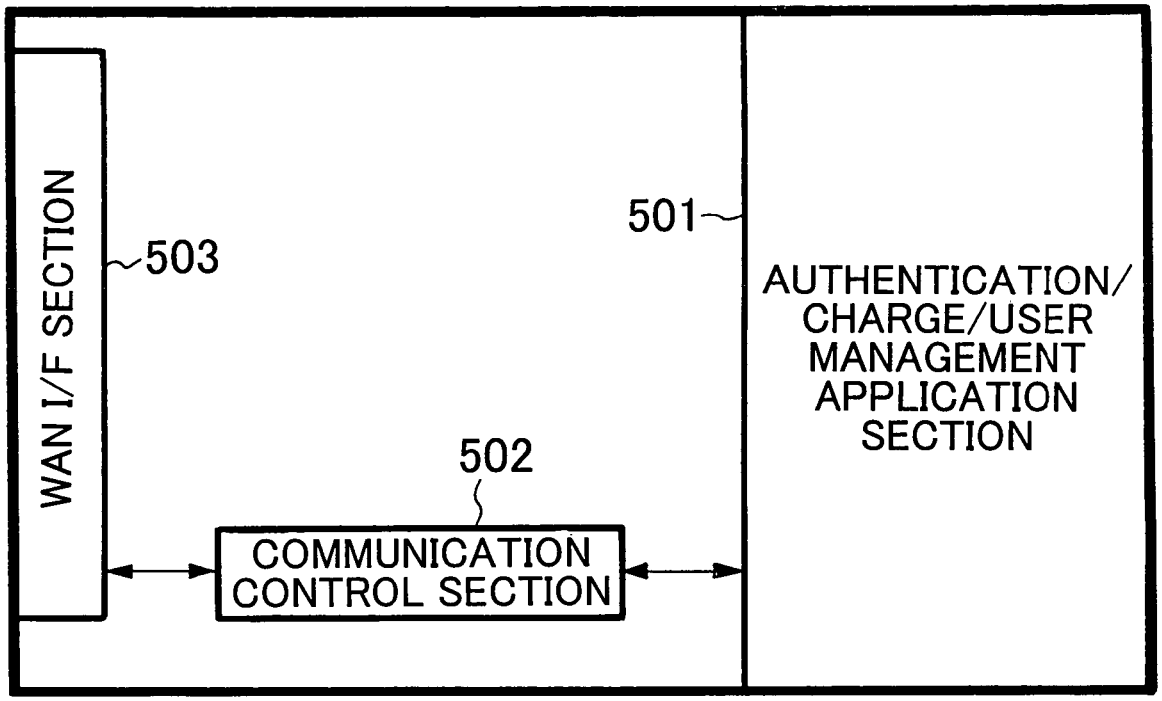
FIG. 5 is a block diagram showing the structure of a service management server in FIG. 1.

FIG. 5 is a block diagram showing the structure of the service management server. As shown in FIG. 5, each of the service management servers A and B comprises an authentication/charge/user management application section 501, a communication control section 502 and a WAN I/F section 503. The authentication/charge/user management application section 501 stores information shown in FIG. 7 as an internal table.

In FIG. 7, "701" to "706" denote information for users who have contracted with the provider that operates the associated service management server. "701" is the ID of a contracted user, "702" is the password of the contracted user, "703" is the MAC address of a terminal which is currently used by the user, "704" is the monthly roaming communication amount of the user, "705" is the monthly roaming communication time of the user, and "706" is a roaming charge for the user, i.e., a roaming charge which is computed from the monthly roaming communication amount 704 and the monthly roaming communication time 705 and which the provider who is operating the service management server should pay to the roaming-provided provider.

"707" to "711" denote information for users who have used, by roaming, a wireless LAN base station owned by the provider that operates the associated service management server. "707" is the ID of the user that is commonly used among providers, "708" is the MAC address of a terminal which is currently used by the user, "709" is the monthly roaming communication amount of the user, "710" is the monthly roaming communication time of the user, and "711" is a roaming charge for the user, i.e., a roaming charge which is computed from the monthly roaming communication amount 709 and the monthly roaming communication time 710 and which the provider who has a contract with the user should pay to the provider who is operating the service management server.

The following are the schematic operations of the individual sections of the service management server in FIG. 5. First, the authentication/charge/user management application section 501 receives an authentication request from the authentication gateway, a user ID and password from the communication control section 502, and performs retrieval and comparison of an ID and password in the internal table. At this time, when there is a match, the application section 501 issues an authentication reception acknowledgment to the authentication gateway, whereas when there is no match, the application section 501 sends the authentication gateway an interprovider roaming request together with the ID and password and the MAC address of the terminal via the communication control section 502 and WAN I/F section 503.

The communication control section 502 transmits data received from the WAN I/F section 503 to the management application section 501, and transmits data to the WAN I/F section 503 upon reception of a transmission request from the management application section 501. The WAN I/F section 503 transmits and receives data to and from the Internet 102.

Figure 6:
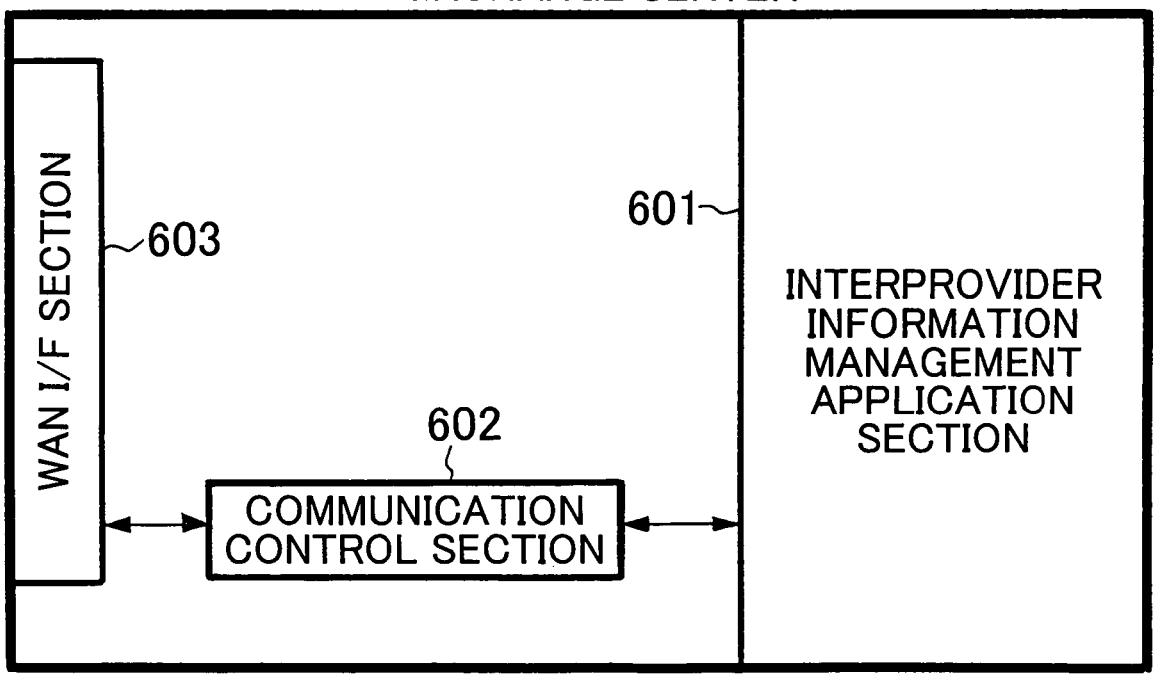
FIG. 6 is a block diagram showing the structure of an interprovider user information exchange server in FIG. 1.

FIG. 6 is a block diagram showing the structure of the interprovider user information exchange server 103. The user information exchange server 103 comprises an interprovider information management application section 601, a communication control section 602 and a WAN I/F section 603 as shown in FIG. 6. The information management application section 601 stores information shown in FIG. 8 as an internal table.

That is, stored in fields 801 to 804 of the internal table in FIG. 8 are user information of the entire wireless LAN communication connection service providers. Specifically, "801" is a user ID common among the providers, which is used at the time of interprovider roaming, "802" is the contracted provider of that user, "803" a provider inherent ID of the user and "804" is a password corresponding to the ID.

A roaming history of the user is stored in fields 805 to 809. Specifically, "805" is an ID common among the providers, "806" is a list of roaming-provided providers whom the user has used, "807" is the monthly roaming communication amount of the user for each of roaming-provided providers, "808" is a monthly roaming communication amount, and "809" is a roaming charge for each roaming-provided provider computed from the monthly roaming communication amount 807 and the monthly roaming communication time 808.

The following are the schematic operations of the individual sections of the interprovider user information exchange server 103 in FIG. 6. First, the information management application section 601 performs a match/retrieval process on the internal tables 801 and 802 from the ID and password included in the interprovider roaming request received from the communication control section 602 and transmits an authentication reception acknowledgment to the sender's service management server via the communication control section 602 and the WAN I/F section 603 when there is a matched entry found. When there is no matched entry found, the interprovider information management application section 601 transmits an authentication rejection in a similar manner.

Next, the operation of the embodiment will be described specifically referring to FIGS. 9 to 12. FIG. 9 is a flowchart illustrating the flow of processes of the wireless terminal, FIG. 10 is a flowchart illustrating the flow of processes of the authentication gateway, FIG. 11 is a flowchart illustrating the flow of processes of the service management server and FIG. 12 is a flowchart illustrating the flow of a roaming charge settling process.

As the wireless terminal A is activated as shown in FIG. 9 first, the wireless LAN I/F section 205 of the wireless terminal A receives a beacon (communication signal) of a wireless LAN base station located around and retrieves a base station (step A1). The following description of this case is premised on that the wireless terminal A lying at the boundary of the communication ranges of the wireless LAN base stations A 106 and B 109 or lying in the beacon reaching range of the two base stations A and B has been activated.

Next, the wireless terminal A determines whether or not a base station has been found (step A2). It is assumed that the wireless terminal A lies in the beacon reaching range of the wireless LAN base station A 106 and the wireless LAN base station B 109 as shown in FIG. 1 and the wireless LAN I/F section 205 has received a beacon generated from the wireless LAN base station A 106 first. The base-station detecting section 202 detects it and informs the application section 201 of that event. The application section 201 transmits and receives dummy data for measuring the communication speed to and from the base station A 106 via the communication control section 204 and the wireless LAN I/F section 205 and the communication-speed detecting section 203 computes the average speed and informs the application section 201 of the speed (step A3).

Then, returning to step A1, the wireless LAN I/F section 205 receives a beacon (communication signal) from the other wireless LAN base station and performs retrieval of a base station. At this time, the wireless LAN I/F section 205 receives the beacon from the base station B 109 and the base-station detecting section 202 detects it and informs the application section 201 of that event (step A2). The application section 201 likewise transmits and receives dummy data for measuring the communication speed to and from the base station B 109 via the communication control section 204 and the wireless LAN I/F section 205, and the communication-speed detecting section 203 computes the average speed and informs the application section 201 of the speed (step A3).

Next, as no beacon other than those from the base station A 106 and base station B 109 does not reach the wireless terminal A, the decision in step A2 is negative (NO) and the flow proceeds to step A4 to determine whether or not one or more base stations are found. In this case, one or more base stations are found, the flow proceeds to step A5 to determine whether or not two ore more base stations are found. As two base stations are found at this time, the decision in step A5 is affirmative (YES) and the flow proceeds to step A6.

In step A6, the application section 201 compares the average communication speed in case of the base station A 106 with the average communication speed in case of the base station B 109 and determines a to-be-connected base station based on the comparison result. That is, in this case, the average communication speed of the wireless LAN base station B 109 is detected to have been faster than the average communication speed of the wireless LAN base station A 106, and the application section 201 decides the base station B109 with a faster average communication speed as the to-be-connected base station and starts communication with the base station 109 via the communication control section 204 and wireless LAN I/F section 205 (step A7).

The wireless LAN base station B 109 transfers the communication data to the authentication gateway B 111 via the wireless LAN I/F section 303, the communication control section 302 and the wired LAN I/F section 301.

The authentication gateway B 111 receives the communication data from the base station B 109 at the communication control section 405 via the LAN I/F section 407 as shown in FIG. 10 (step B1). Upon reception of the data, the communication control section 405 transfers the data to the WAN I/F section 406 via the terminal connection control section 403 (step B1). At this time, the terminal connection control section 403 searches the connecting-wireless-terminal MAC address memory section 402 to check if the MAC address of the wireless terminal A is registered (step B2).

In this case, the MAC address has not been registered yet and the terminal connection control section 403 notifies the authentication request/gate management application section 401 that there has been communication from an unregistered terminal. The authentication request/gate management application section 401 transmits an input request for an ID and password to the wireless LAN base station B 109 via the communication control section 405 and the LAN I/F section 407 (step B3).

The wireless LAN base station B 109 transfers the request to the wireless terminal A via the wired LAN I/F section 301, the communication control section 302 and the wireless LAN I/F section 303. Let us now return to FIG. 9. The wireless terminal A receives the request at the application section 201 via the wireless LAN I/F section 205 and the communication control section 204 (step A8). The application section 201 prompts the user to input an ID and password. As the user inputs the ID and password, the application section 201 sends them to the wireless LAN base station B 109 via the communication control section 204 and the wireless LAN I/F section 205 (step A9). At this time, the wireless LAN base station B 109 also acquired the MAC address automatically.

The wireless LAN base station B 109 sends the ID and password and the MAC address to the authentication gateway B 111 via the wireless LAN I/F section 303, the communication control section 302 and the wired LAN I/F section 301.

The authentication gateway B 111 receives the ID and password and so forth at the authentication request/gate management application section 401 via the LAN I/F section 407 and the communication control section 405 as shown in FIG. 10 (step B4). The authentication request/gate management application section 401 transfers the received ID and password and MAC address of the wireless terminal to the service management server B 105 via the communication control section 405 and the WAN I/F section 406 (step B5).

As shown in FIG. 11, the service management server B 105 receives the ID and password and the MAC address of the wireless terminal A at the authentication/charge/user management application section 501 via the WAN I/F section 503 and the communication control section 502 (step C1). Upon reception of those pieces of information, the application section 501 retries a user ID 701 and password 702 in a table shown in FIG. 7 and compares them with the received user ID and password (step C2).

Because the user of the wireless terminal A is a contracted user of the provider A at this time, the user is not registered in the service management server B 105 of the provider B and there is no entry which has a matched ID and password. In this case, the authentication/charge/user management application section 501 transfers the received ID and password and MAC address to the interprovider user information exchange server 103 via the communication control section 502 and the WAN I/F section 503 (step C3).

The interprovider user information exchange server 103 receives the ID and password and MAC address at the interprovider information management application section 601 via the WAN I/F section 603 and the communication control section 602. The application section 601 searches a table in FIG. 8 to check if the received ID and password with the provider inherent user ID 803 and provider inherent user password 804 in the table. As the user of the wireless terminal A is registered in the interprovider roaming service, a matched entry will be found. Next, the application section 601 reads the interprovider common ID of the user of the wireless terminal A from the field 801 of that entry and informs the service management server B 105 of the interprovider common ID together with authentication permission via the communication control section 602 and the LAN I/F section 603.

As shown in FIG. 11, the service management server B 105 receives the authentication permission and the interprovider common ID at the authentication/charge/user management application section 501 via the WAN I/F section 503 and the communication control section 502 (step C4), and notifies the authentication permission to the authentication gateway B 111 via the communication control section 502 and the WAN I/F section 503 after registering the received interprovider common ID in the interprovider common ID 707 in the table in FIG. 7 and the MAC address of the wireless terminal A in the MAC address 708 (step C5).

When the authentication gateway B 111 receives the authentication permission at the authentication request/gate management application section 401 via the WAN I/F section 406 and the communication control section 405 (step B6), stores the MAC address of the wireless terminal A in the connecting-wireless-terminal MAC address memory section 402 in FIG. 4 (step B7) and sends the authentication permission to the wireless LAN base station B 109 via the communication control section 405 and the LAN I/F section 407 (step B8) as shown in FIG. 10.

The wireless LAN base station B 109 receives an authentication permission notification from the authentication gateway B 111 at the wired LAN I/F section 301 and transfers it to the wireless terminal A via the communication control section 302 and the wireless LAN I/F section 303.

The wireless terminal A receives the authentication permission notification at the application section 201 via the wireless LAN I/F section 205 and the communication control section 204 and decides that authentication is OK as shown in FIG. 9 (step A10). Upon reception of the authentication permission notification, the application section 201 starts data communication with the wireless LAN base station B 109 over the Internet 102 (step A12).

The first data from the wireless terminal A is first received at the wireless LAN I/F section 303 of the wireless LAN base station B 109 and the data is transferred to the authentication gateway B 111 via the communication control section 302 and wired LAN I/F section 301.

The authentication gateway B 111 receives the data at the LAN I/F section 407 (step B1) and the communication control section 405 gives the data to the terminal connection control section 403 as shown in FIG. 10. The terminal connection control section 403 searches the connecting-wireless-terminal MAC address memory section 402 for the MAC address of the wireless terminal A (step B2). As the MAC address of the wireless terminal A has already been registered at this time, the decision in step B2 is YES and the flow proceeds to step B10. The terminal connection control section 403 transfers the data to the communication destination (which is normally the Web servers on the Internet 102) via the WAN I/F section 406 (step B10).

At this time, the communication control section 405 notifies the communication amount and communication time to the authentication request/gate management application section 401. The authentication request/gate management application section 401 sends the communication amount, the communication time and the MAC address of the wireless terminal A to the service management server B 105 (step B11).

The service management server B 105 receives the communication amount, the communication time and the MAC address of the wireless terminal A via the WAN I/F section 503 and the communication control section 502, finds an entry of the wireless terminal A which matches with the MAC address of the wireless terminal A received from the MAC address 708 in the table in FIG. 7, and adds the received communication amount and communication time to the monthly roaming communication amount 709 and monthly roaming communication time 710 of that entry. The roaming charge 711 is automatically computed in accordance with the communication amount and communication time according to the settlement done between the provider A and the provider B and is recorded (step B12).

Even when data addressed to the wireless terminal A is transmitted to the authentication gateway B 111 and wireless LAN base station B 109 from the communication destination on the Internet 102, on the other hand, the communication amount and communication time are likewise added to the associated information in the service management server B 105.

Next, the roaming charge settling process will be discussed. When a prearranged payday, such as the end of a month, comes (step D1), the communication amount, the communication time and the roaming charge recorded in the service management server are transmitted together with the interprovider common ID to the interprovider user information exchange server 103 from the service management server (step D2).

The interprovider user information exchange server 103 searches the table in FIG. 8 to check if the received interprovider common ID matches with the interprovider common ID 805 in the table and specifies the entry of the user. In case where the received interprovider common ID is not found in the table, a new entry is created.

Next, the roaming-provided providers 806 in the table in FIG. 8 is searched with the name of the provider who owns the service management server which has received the data, and the entry of the provider name in the user entry is specified. In case where the provider name is not found in the table, a new entry is created. After the entry is specified through the above-described work, the received communication amount, communication time and roaming charge are respectively recorded in the monthly roaming communication amount 807, the monthly roaming communication time 808 and roaming charge 809 in the table in FIG. 8 (step D3).

Further, when the due hour or the like on the due date has come (step D4), the service management server of the roaming-received provider (the provider who has used roaming or the provider A in the example of the wireless terminal A) is informed of the associated communication amount, communication time and roaming charge, for each roaming-provided provider, together with the provider inherent ID of the user who has used roaming (step D5).

The service management server determines whether the received provider inherent user ID matches with the user ID 701 in the table in FIG. 7 or not. If there is a match, the service management server stores the received communication amount, communication time and roaming charge in the monthly roaming communication amount 704, the monthly roaming communication time 705 and the roaming charge 706 in the associated entry respectively. Accordingly, the service management server pays a charge recorded in the roaming charge 706 to the roaming-provided provider.

If the wireless terminal A has no data transmission/reception over a given time, the authentication gateway B 111 deletes the MAC address of the wireless terminal A from the connecting-wireless-terminal MAC address memory section 402.

Second Embodiment

The second embodiment of the invention will now be described. The ID and password which are used by a wireless LAN communication connection service provider who has contracts with the users are registered in the interprovider user information exchange server in the first embodiment. If the ID and password of the wireless LAN communication connection service provider who has contracts with the users are used at the time of roaming, however, the ID and password flow to the servers of other wireless LAN communication connection service providers, which may raise a security issue.

In the second embodiment, the provider inherent user ID and password are not registered in the interprovider information exchange server and the interprovider user information exchange server issues a one-time ID and one-time password which are valid over a given period of time every time a roaming service is used.

Specifically, after the wireless terminal A decides the wireless LAN base station to be connected in the first embodiment (step A6 in FIG. 9), the roaming request is transmitted to the service management server A via the wireless LAN base station (the wireless LAN base station A in this case) of the wireless LAN communication connection service provider with whom the user who uses the wireless terminal A has a contract and the authentication gateway A.

The service management server A which has received the roaming request requests the interprovider user information exchange server 103 to issue a password (one-time password) and ID (one-time ID) which are valid only over a given time together with the provider inherent ID of the user. The interprovider user information exchange server 103 generates a one-time password and one-time ID based on a random key (time or the like), searches the interprovider common IDs 801 in the table in FIG. 8 with the received interprovider common ID and stores the one-time password and one-time ID, generated previously, in the provider inherent user ID 803 and the provider inherent user password 804 of the associated entry.

The subsequent processes (processes following step A7 in FIG. 9) are the same as the corresponding processes of the first embodiment. When the one-time password and one-time ID stored in the provider inherent user ID 803 and the provider inherent user password 804 of the table in FIG. 8 are deleted by the interprovider user information exchange server 103 when the valid period expires. The second embodiment is quite the same as the first embodiment except for the use of the one-time password and one-time ID. Apparently, the second embodiment can prevent the ID and password of a user from being leaked to other providers than the contracted provider.

Third Embodiment

Figure 13:
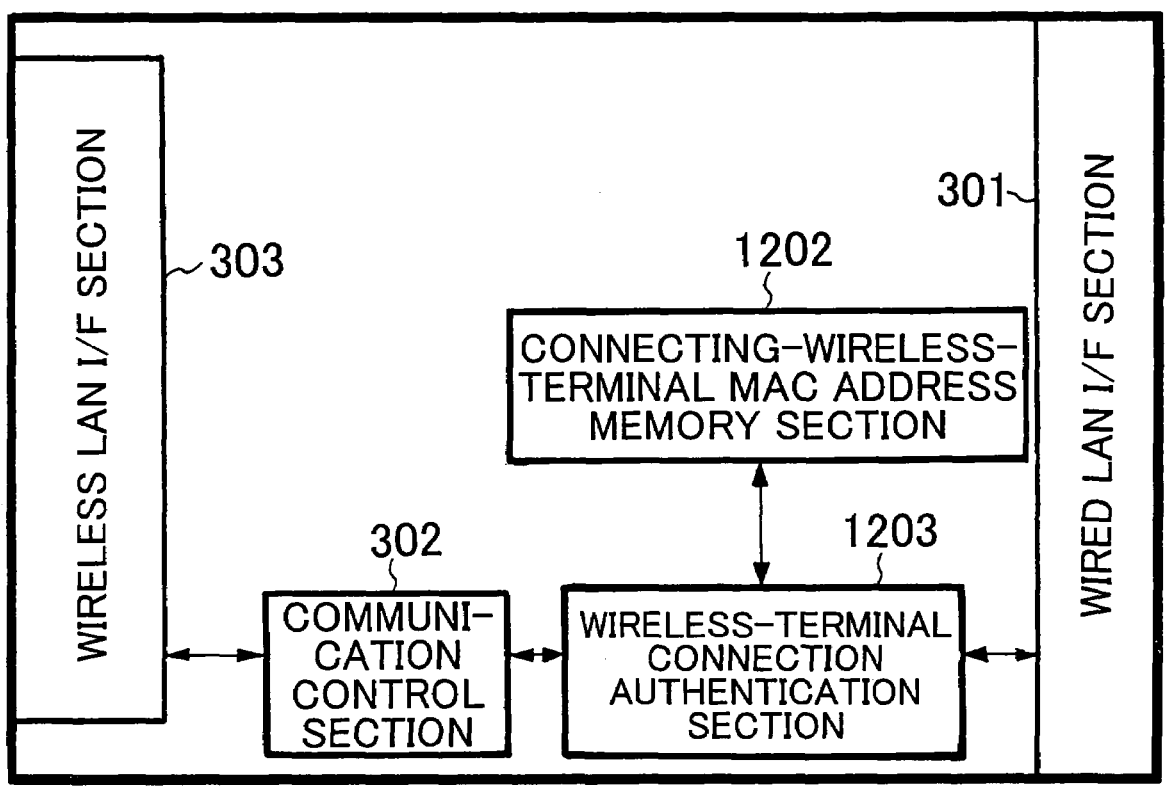
FIG. 13 is a block diagram illustrating a wireless LAN base station according to a third embodiment of the invention.

The third embodiment of the invention will now be described. In some case, the wireless LAN communication connection service provider may provide the wireless LAN base station itself with a capability of authenticating connection using the MAW address of a wireless terminal. FIG. 13 illustrates the structure of a wireless LAN base station in that case. FIG. 13 has like or same reference numerals given to those components which are the same as the corresponding components in FIG. 3. The system structure is the same as that shown in FIG. 1.

In FIG. 13, "1202" denotes a connecting-wireless-terminal MAC address memory section which stores the MAC address of a wireless terminal whose connection has been permitted, and "1203" denotes a wireless-terminal connection authentication section which controls the connection of a wireless terminal referring to the connecting-wireless-terminal MAC address memory section 1202. The other structure is the same as that in FIG. 3. In the structure in FIG. 13, even when the wireless terminal A starts data communication, the MAC address of the wireless terminal A is not registered in the connecting-wireless-terminal MAC address memory section 1202 of the wireless LAN base station B so that the wireless LAN base station B is rejected. This inhibits data from reaching the authentication gateway B and disables the initiation of the process in step B1 in FIG. 10, so that the roaming service cannot be used.

In this embodiment, the MAC address of the wireless terminal A is registered in the wireless LAN base station B via the wireless LAN base station of the wireless LAN communication connection service provider with which the user of the wireless terminal A has a contract.

Specifically, as described in the foregoing description of the first embodiment, after the wireless terminal A decides the wireless LAN base station to be connected (step A6 in FIG. 9), the roaming request is transmitted to the service management server A via the wireless LAN base station (the wireless LAN base station A in this case) of the wireless LAN communication connection service provider with whom the user who uses the wireless terminal A has a contract and the authentication gateway A. The service management server A which has received the roaming request notifies the interprovider common ID and the MAC address of the wireless terminal A to the interprovider user information exchange server.

The interprovider user information exchange server 103 notifies the received MAC address to the service management server B 105 which in turn registers the MAC address received via the authentication gateway B 111 into the connecting-wireless-terminal MAC address memory section 1202 of the wireless LAN base station B 109. Thereafter, the wireless-terminal connection authentication section 1203 passes communication from the wireless terminal A directly. The subsequent processes (processes following step A7 in FIG. 9) are the same as the corresponding processes of the first embodiment. The third embodiment can ensure roaming even if the wireless LAN base station is doing authentication based on the MAC address.

Fourth Embodiment

The fourth embodiment of the invention will now be described. In the first embodiment, if multiple users of the wireless LAN communication connection service provider A connect to the wireless LAN base station B in the time zone where the wireless LAN base station B of the wireless LAN communication connection service provider B in the shop B is congested, for example, the communication speed of the wireless terminal of the user who has contracted with the provider B who is the original user of the wireless LAN base station B becomes slower too.

Increasing the number of wireless LAN base stations to overcome the shortcoming results in a cost increase. In the embodiment, the time zone where the wireless LAN base station is used is restricted for each wireless LAN communication connection service provider. Alternatively to keep a constant communication quality, when the average communication speed per user goes below a given communication speed, users or providers are ranked in accordance with the charging plan and connection is restricted in order from that terminal which has a lower rank.

Specifically, in case of restricting the tine zone, at the time the service management server B 105 transfer an authentication request to the interprovider user information exchange server 103 (step C3 in FIG. 11), the service management server B 105 receives contracted provider information (provider A in this embodiment) described in the contracted provider 802 in the table in FIG. 8 together with an authentication permission notification.

The authentication/charge/user management application section 501 of the service management server B 105 which has received the contracted provider information collates the current time with the time for providing a roaming service to the provider A, determines whether or not the current time is in the providing period of time and transmits an authentication permission to the authentication gateway based on the decision result (step D5 in FIG. 11) or determine whether or not to send an authentication rejection (step C6 in FIG. 11). The received contracted provider information (provider A in the embodiment) is also stored in the table.

Further, in case where the wireless terminal A has already received an authentication permission and the roaming service time of the provider A ends during communication, the service management server B searches the table for the users of the provider whose service times have ended, and sort out the users of the provider who has finished the service in addition to the user of the provider A including the user who is using the wireless terminal A. Thereafter, the MAC address of the wireless terminal which is used by the retrieved user and a terminal authentication cancel command are transmitted to the authentication gateway B. The connecting-wireless-terminal MAC address memory section 402 in the authentication gateway B deletes the MAC address.

In case where contracted wireless LAN communication connection service providers are ranked, the names of the contracted wireless LAN communication connection service providers and the corresponding table of the service ranks are added to the authentication/charge/user management application section 501. It is assumed here that the wireless terminal A has attempted to use the wireless LAN base station with the average communication speed of the shop B equal to a predetermined lowest communication speed.

The current average communication speed and the number of connected terminals of the shop B are measured by the terminal-communication-speed detecting section 404 of the authentication gateway B 111 and are stored one after another in the table in the service management server B 105. At the time the service management server B 105 transfers the authentication request to the interprovider user information exchange server 103 in response to a connection request received from the wireless terminal A (step C3 in FIG. 11), the service management server B 105 receives the authentication permission notification and the contracted wireless LAN communication connection service provider information (provider A in the embodiment) described in the field 802 in the table in FIG. 8 from the interprovider user information exchange server 103 (step C4 in FIG. 11).

The authentication/charge/user management application section 501 of the service management server B 105 which has received the contracted wireless LAN communication connection service provider information compares the service rank of the provider A with the service rank of another provider which is currently connected through the roaming service. In case where the service rank of the provider A is lower than the service rank of any one of the other providers being connected at this time, the authentication rejection notification is sent to the authentication gateway B (step C6 in FIG. 11).

In case where any one of the other providers being connected has a service rank lower than the service rank of the provider A, on the other hand, the authentication permission notification is sent to the authentication gateway B (step C5 in FIG. 11). Thereafter, one user is selected from those of the provider whose service rank is low and the terminal authentication cancel command is transmitted together with its MAC address to the authentication gateway B 111. The connecting-wireless-terminal MAC address memory section 402 of the authentication gateway B 111 deletes the MAC address.

In case where the average communication speed drops during communication due to some reason, such as a deterioration in radio communication state, one user is selected from those currently connected of the provider which has the lowest service rank and the terminal authentication cancel command is transmitted together with its MAC address to the authentication gateway B 111. The connecting-wireless-terminal MAC address memory section 402 of the authentication gateway B 111 deletes the MAC address. The deletion of the MAC address of the terminal of the provider having the lowest rank is repeated until the average communication speed becomes is equal to or greater than the lowest average communication speed.

Next, in case where the users are ranked, the table of the service ranks is added to the table for users contracted with other providers in the authentication/charge/user management application section 501 of the service management server according to the first embodiment. It is assumed that in the first embodiment, the wireless terminal A has used the wireless LAN base station B 109 with the average communication speed of the shop B equal to the predetermined lowest communication speed.

The current average communication speed and the number of connected terminals of the shop B are measured by the terminal-communication-speed detecting section 404 of the authentication gateway B 111 and are stored one after another in the table in the service management server B 105. At the time the service management server B 105 transfers the authentication request to the interprovider user information exchange server 103 in response to a connection request received from the wireless terminal A (step C3 in FIG. 11), the service management server B 105 receives the authentication permission notification and the service rank of that user from the interprovider user information exchange server 103 (step C5 in FIG. 11).

The authentication/charge/user management application section 501 of the service management server B 105 which has received the service rank compares the service rank with the service rank of another user who is currently connected through the roaming service. In case where the service rank of the user who is using the wireless terminal A is lower than the service rank of any one of the other users being connected at this time, the authentication rejection notification is sent to the authentication gateway B (step C6 in FIG. 11).

In case where any one of the other users being connected has a service rank lower than the service rank of the user of the wireless terminal A, on the other hand, the authentication permission notification is sent to the authentication gateway B (step C5 in FIG. 11). Thereafter, one user is selected from the users whose service ranks are low and the terminal authentication cancel command is transmitted together with the MAC address of the wireless terminal used by that user to the authentication gateway B 111. The connecting-wireless-terminal MAC address memory section 402 of the authentication gateway B 111 deletes the MAC address.

In case where the average communication speed drops during communication due to some reason, such as a deterioration in radio communication state, one user is selected from those currently connected who have the lowest service rank and the terminal authentication cancel command is transmitted together with its MAC address to the authentication gateway B 111. The connecting-wireless-terminal MAC address memory section 402 of the authentication gateway B 111 deletes the MAC address. The deletion of the MAC address of the terminal of the user having the lowest rank is repeated until the average communication speed becomes is equal to or greater than the lowest average communication speed.

Although connection of a service provider the rank of whose charging plan is low or a user the rank of whose charging plan is low is restricted in case where the average communication speed falls below the lowest average communication speed in the foregoing description, the invention is not limited to this particular case but the number of simultaneously connectable users may be set beforehand so that when the number of users exceeds the former number, connection of a service provider whose rank is low or a user whose rank is low is restricted.

Fifth Embodiment

The fifth embodiment of the invention will now be described. Because a business model which provides the manager of a shopping center such as a mall where a plurality of wireless LAN communication connection service providers have shops is not established in the first to fourth embodiments, it is difficult to provide a wireless LAN base station in common space of the shopping center and the service providing area may not be enlarged in some case.

This embodiment provides a scheme of gathering the frequency of usage (communication amount and communication time) of the wireless LAN base station of the provider which is sited in the common space of a shopping center and transmitting the frequency of usage to the service management server of the shopping center, so that the provider pays a charge according to the frequency of usage to the manager of the shopping center.

Figure 14:
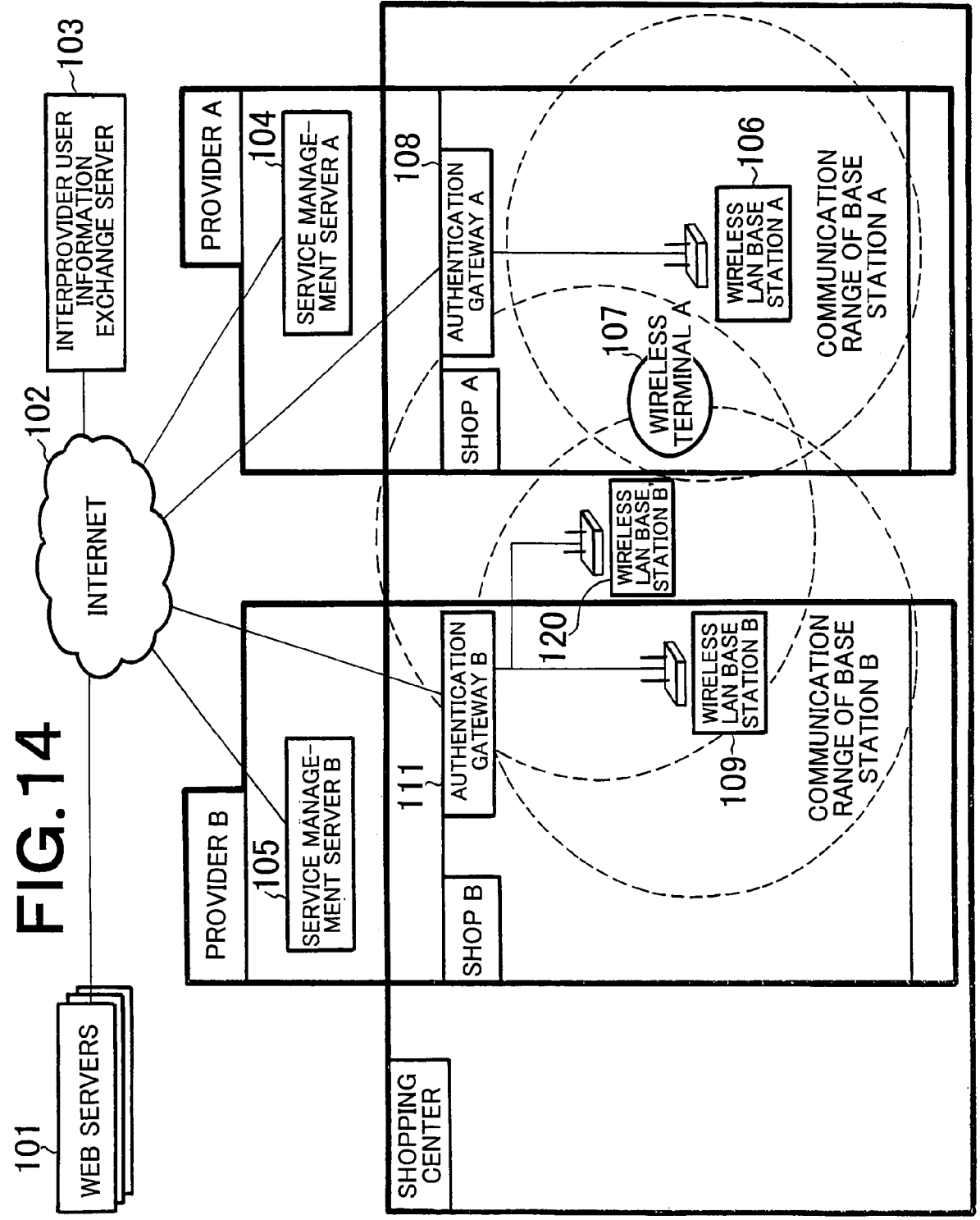
FIG. 14 is a block diagram illustrating a fifth embodiment of the invention.
Figure 15:
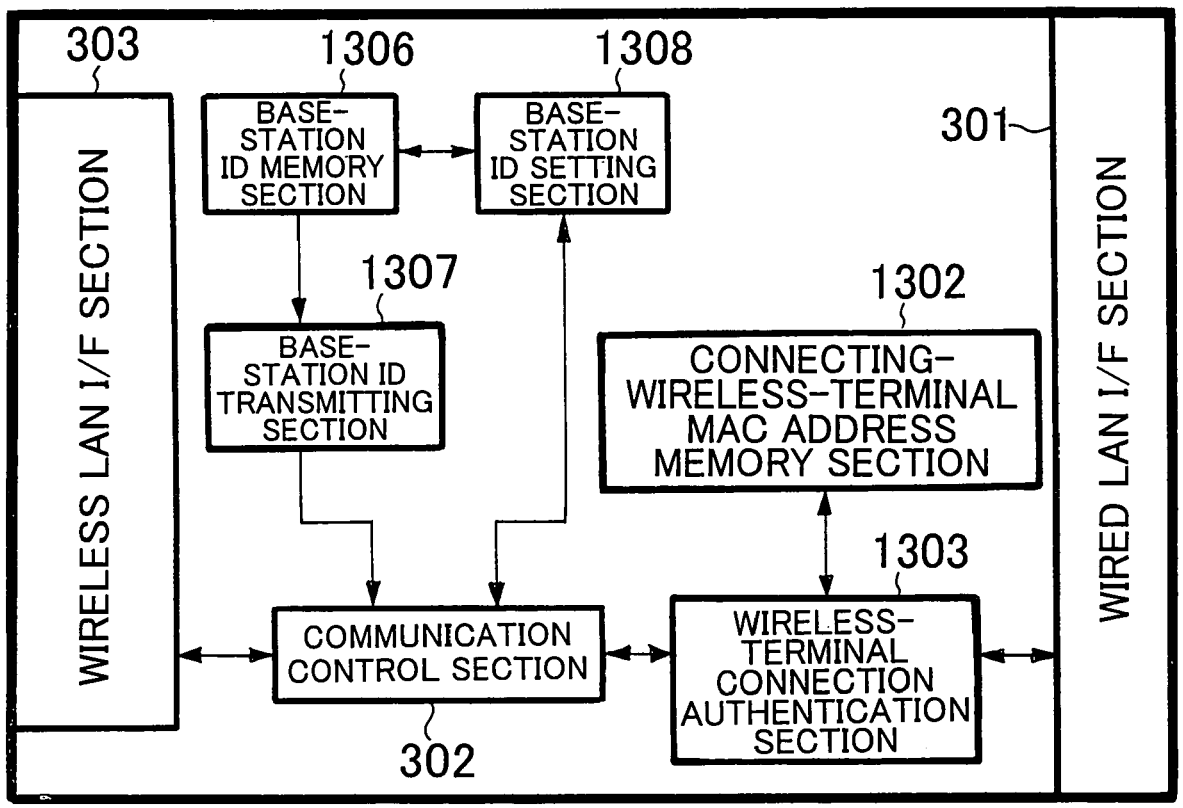
FIG. 15 is a block diagram illustrating a wireless LAN base station according to the embodiment in FIG. 14.

FIG. 14 is a block diagram illustrating the structure of the fifth embodiment. FIG. 14 shows an example in case where a wireless LAN base station B' 120 of the provider is sited in the common space of the shopping center. FIG. 15 is a block diagram illustrating the structure of the wireless LAN base station B' 120. FIG. 15 has like or same reference numerals given to those components which are the same as the corresponding components in FIG. 3. In FIG. 15, a base-station ID memory section 1306 which stores a base-station ID, a base-station ID transmitting section 1307 which sends a provider inherent user ID and a base-station ID setting section 1308 which sets the provider inherent user ID are provided in addition to the structure of the base station in FIG. 3. The provider B sets the provider inherent user ID in the base-station ID memory section 1306 through the base-station ID setting section 1308, then sites the wireless LAN base station B' 120 in the common space of the shopping center.

At the time of authenticating the wireless terminal of the first embodiment (step C2 or step C4 in FIG. 11), the service management server B 105 receives the provider inherent user ID of the wireless LAN base station which is used by that wireless terminal (wireless LAN base station B' in this case) from the base-station ID transmitting section 1307 and stores it in the internal table. Thereafter, every time the communication amount and communication time of transmission/reception data to or from the wireless terminal is transmitted to the service management server B from the authentication gateway B (step B11 in FIG. 10), the communication amount and communication time are stored in association with the provider inherent user ID. The provider B pays a charge to the manager of the shopping center accordance with the communication amount and communication time.

Sixth Embodiment

The sixth embodiment of the invention will now be described. In the fifth embodiment, there may be a case where the wireless LAN base stations of a plurality of providers are present in the common space of the shopping center. This case would raise a problem of the contention of radio channels or insufficient common space. To cope with the problem, the manager of a common space sites a wireless LAN base station in the common space and rents the wireless LAN base station to a plurality of providers in this embodiment.

Figure 16:
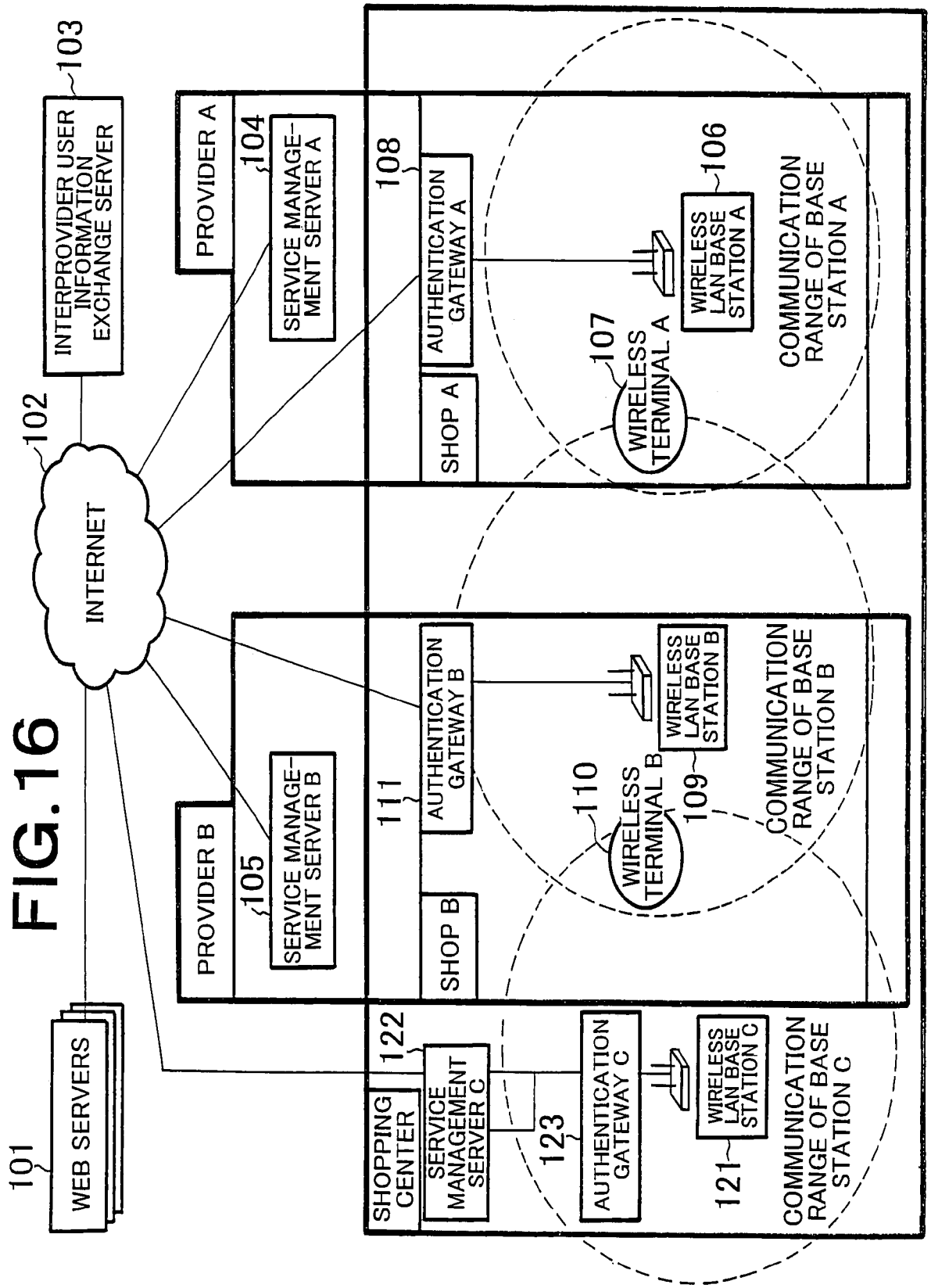
FIG. 16 is a block diagram illustrating a sixth embodiment of the invention.

In this case, the frequency of usage (communication amount and communication time) is gathered for each contracted provider of the user who used the wireless LAN base station and the provider pays a charge to the manager of the shopping center in accordance with the frequency of usage. FIG. 16 shows the general structure in this case. FIG. 16 has like or same reference numerals given to those components which are the same as the corresponding components in FIG. 1. A wireless LAN base station C 121, a service management server C 122 and an authentication gateway C 123 which performs authentication on connection from the wireless LAN base station C 121 to the Internet 102 are provided in the common space of the shopping center which contain the shop A and shop B.

Although the detailed operation of this embodiment is omitted, the operation can be understood if readers read the wireless terminal A in the first to fifth embodiments as the wireless LAN base station B, the wireless LAN base station A as the wireless LAN base station B, the wireless LAN base station B as the Wireless LAN base station C, the authentication gateway A as the authentication gateway B, the authentication gateway B as the authentication gateway C, the service management server A as the service management server B and the service management server B as the service management server C. That is, one should replace the relationship between the equipment of the provider A and the equipment of the provider B with the equipment newly added in the common space.

With the structure in FIG. 16, the sixth embodiment can restrict the use time zone of the wireless LAN base station in the common space provider by provider or separate the providers or users according to the charge service ranks and cancel connection authentication from users who have lower service ranks one after another in case where the communication amount becomes equal to or lower than a given communication speed.

According to the invention, as described above, an investment in equipment, such as a wireless LAN base station, can be suppressed and the convenience for users can be improved as different service providers who provide services for wireless LAN communication connection to the Internet are allowed to share equipment, such as the wireless LAN base station. This can ensure a stable income with fewer pieces of equipment.

What is claimed is:

1. A system for wireless LAN (Local Area Network) communication, comprising:
   a user terminal for a user;
   a plurality of wireless LAN base stations shared by a plurality of service providers for providing an Internet-access service, said plurality of service providers including a first service provider to be contracted with said user and a second service provider not to be contracted with said user, said plurality of wireless LAN base station including a first wireless LAN base station managed by said first service provider and a second wireless LAN base station managed by said second service provider;
   means for obtaining a one-time password and one-time ID that are associated with said user and valid for a given period of time every time said user terminal is connected to any one of said wireless LAN base stations other than said first wireless LAN base station;
   means for connecting said user terminal to said second wireless LAN base station using said one-time password and one-time ID;
   means for collecting data of a communication amount and communication time of said user terminal, when said user terminal is connected to said second wireless LAN base station; and
   means for enabling said first service provider to pay a charge on usage of said second wireless LAN base station to said second service provider in accordance with said communication amount and communication time.

2. The system according to claim 1, further comprising:
   means for informing said second service provider of a MAC address of said user terminal, when said user terminal is connected to said second wireless LAN base station; and
   means for authenticating whether or not to permit connection between said user terminal and said second wireless LAN base station based on the MAC address.

3. The system according to claim 1, further comprising:
   means for refusing connection of said user terminal to said second wireless LAN base station when a time of usage thereof is out of the given period of time.

4. The system according to claim 1, further comprising
   means for ranking each of users of said first service provider in accordance with charge plans on usage of said second wireless LAN base station; and
   means for restricting connection in order from said each of users with a lower rank, in case that an average communication speed per user falls below a predetermined communication speed or in case that a number of connections to said second wireless LAN base station exceeds a preset number of connections of simultaneously connectable users.

5. The system according to claim 1, wherein
   said plurality of wireless LAN base stations include a third wireless LAN base station which is pre-sited in common space of a shopping center and is managed by a manager of said shopping center, and said system further comprises:

means for connecting said user terminal to said third wireless LAN base station using said one-time password and one-time ID;

means for collecting data of a communication amount and communication time of said user terminal, when said user terminal is connected to said third wireless LAN base station; and means for enabling said first service provider to pay a charge on usage of said third wireless LAN base station to said manager in accordance with said communication amount and communication time.

6. The system according to claim 5, further comprising:
means for refusing connection of said user terminal to said third wireless LAN base station when a time of usage thereof is out of the given period of time.

7. The system according to claim 5, further comprising:
means for ranking each of users in accordance with charge plans on usage of said third wireless LAN base station; and means for restricting connection in order from said each of users with a lower rank, in case that an average communication speed per user falls below a predetermined communication speed or in case that a number of connections to said third wireless LAN base station exceeds a preset number of connections of simultaneously connectable users.

8. A method for wireless LAN (Local Area Network) communication in a system including a user terminal for a user, and a plurality of wireless LAN base stations shared by a plurality of service providers for providing an Internet-access service, said plurality of service providers including a first service provider to be contracted with said user and a second service provider not to be contracted with said user, said plurality of wireless LAN base station including a first wireless LAN base station managed by said first service provider and a second wireless LAN base station managed by said second service provider, said method comprising:

obtaining a one-time password and one-time ID that are associated with said user and valid for a given period of time every time said user terminal is connected to any one of said wireless LAN base stations other than said first wireless LAN base station;

connecting said user terminal to said second wireless LAN base station using said one-time password and one-time ID;

collecting data of a communication amount and communication time of said user terminal, when said user terminal is connected to said second wireless LAN base station; and enabling said first service provider to pay a charge on usage of said second wireless LAN base station to said second service provider in accordance with said communication amount and communication time.

9. The method according to claim 8, further comprising:
informing said second service provider of a MAC address of said user terminal, when said user terminal is connected to said second wireless LAN base station; and authenticating whether or not to permit connection between said user terminal and said second wireless LAN base station based on the MAC address.

10. The method according to claim 8, further comprising:
refusing connection of said user terminal to said second wireless LAN base station when a time of usage thereof is out of the given period of time.

11. The method according to claim 8, further comprising:
ranking each of users of said first service provider in accordance with charge plans on usage of said second wireless LAN base station; and restricting connection in order from said each of users with a lower rank, in case that an average communication speed per user falls below a predetermined communication speed or in case that a number of connections to said second wireless LAN base station exceeds a preset number of connections of simultaneously connectable users.

12. The method according to claim 8, wherein
said plurality of wireless LAN base stations include a third wireless LAN base station which is pre-sited in common space of a shopping center and is managed by a manager of said shopping center, said method further comprising:

connecting said user terminal to said third wireless LAN base station using said one-time password and one-time ID;

collecting data of a communication amount and communication time of said user terminal, when said user terminal is connected to said third wireless LAN base station; and enabling said first service provider to pay a charge on usage of said third wireless LAN base station to said manager in accordance with said communication amount and communication time.

13. The method according to claim 12, further comprising:
refusing connection of said user terminal to said third wireless LAN base station when a time of usage thereof is out of the given period of time.

14. The method according to claim 12, further comprising:
ranking each of users in accordance with charge plans on usage of said third wireless LAN base station; and restricting connection in order from said each of users with a lower rank, in case that an average communication speed per user falls below a predetermined communication speed or in case that a number of connections to said third wireless LAN base station exceeds a preset number of connections of simultaneously connectable users.

* * * * *

UNITED STATES PATENT AND TRADEMARK OFFICE
CERTIFICATE OF CORRECTION

| | |
|---|---|
| PATENT NO. | : 7,599,692 B2 |
| APPLICATION NO. | : 10/698376 |
| DATED | : October 6, 2009 |
| INVENTOR(S) | : Ooki et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 808 days.

Signed and Sealed this

Twenty-eighth Day of September, 2010

David J. Kappos
*Director of the United States Patent and Trademark Office*